United States Patent
Ni et al.

(10) Patent No.: US 9,088,483 B1
(45) Date of Patent: Jul. 21, 2015

(54) PACKET IDENTIFICATION TRACKER

(71) Applicant: MARVELL INTERNATIONAL LTD., Hamilton (BM)

(72) Inventors: Bin Ni, Sunnyvale, CA (US); Darrel Burk, Westminster, CO (US)

(73) Assignee: MARVELL INTERNATIONAL LTD. (BM)

( * ) Notice: Subject to any disclaimer, the term of this patent is extended or adjusted under 35 U.S.C. 154(b) by 0 days.

(21) Appl. No.: 14/203,988

(22) Filed: Mar. 11, 2014

Related U.S. Application Data (63) Continuation of application No. 13/111,366, filed on May 19, 2011, now Pat. No. 8,683,095.

(60) Provisional application No. 61/350,794, filed on Jun. 2, 2010.

(51) Int. Cl.
*H04L 12/26* (2006.01)

(52) U.S. Cl.
CPC .................. *H04L 43/062* (2013.01)

(58) Field of Classification Search
CPC ..... H04L 47/10; H04L 43/50; H04L 43/0852; H04L 43/00; H04L 12/2697
USPC .......................................... 370/252
See application file for complete search history.

(56) References Cited

U.S. PATENT DOCUMENTS

| | | | |
|---|---|---|---|
| 5,099,346 A | 3/1992 | Lee et al. | |
| 5,349,642 A * | 9/1994 | Kingdon | 713/161 |
| 5,802,105 A | 9/1998 | Tiedemann et al. | |
| 6,523,081 B1 * | 2/2003 | Karlsson et al. | 710/305 |
| 7,334,248 B2 | 2/2008 | Deiss et al. | |
| 8,255,560 B2 | 8/2012 | Inoue et al. | |
| 2004/0107398 A1 * | 6/2004 | Johnson | 714/758 |
| 2007/0157060 A1 | 7/2007 | Ganga et al. | |
| 2011/0050456 A1 * | 3/2011 | Cornwall et al. | 340/870.02 |

* cited by examiner

*Primary Examiner* — Farley Abad (57) ABSTRACT

Systems, methods, and other embodiments associated with tracking packet identifiers are described. According to one embodiment, a method includes receiving a packet of data that includes an encoded packet identifier and decoding the encoded packet identifier into a decoded packet identifier. The method further includes estimating a reliability of the decoded packet identifier and determining a packet identifier of the received packet based, at least in part, on the estimated reliability of the decoded packet identifier.

18 Claims, 4 Drawing Sheets

Sector Search Examples

| Column # | 0 1 2 3 4 5 6 7 | 8 9 10 | 11 12 13 14 15 16 17 18 19 |
|---|---|---|---|
| True AUN | ... 0 1 2 3 4 5 6 7 | 8 x 12 | 13 14 15 16 17 x 20 21 22 |
| Decoded AUN | ... 0 1 2 3 x x x 18 | x x 12 | 13 14 15 16 x x 20 21 22 |
| FW1 | ... 0 1 2 3 [4 5 6 7]->18 [19 20 21]-->12 | | 13 14 15 16 [17 18] 20 21 22 |
| FW0/Output | ... 0 1 2 3 [4 5 6 7] | 8 9 10 | 13 14 15 16 [17 18] 20 21 22 |

FIG. 4

PACKET IDENTIFICATION TRACKER

CROSS REFERENCE TO RELATED APPLICATIONS

The patent disclosure is a continuation of U.S. patent application Ser. No. 13/111,366 filed May 19, 2011, now U.S. Pat. No. 8,683,095, which claims benefit under 35 USC §119(e) to U.S. Provisional Application No. 61/350,794 filed on Jun. 2, 2010, which are hereby wholly incorporated by reference.

BACKGROUND

In many digital communication networks and storage systems, data is transmitted or stored in packets. A packet is a formatted unit of data. In order to facilitate a receiver device or reader device to organize and locate the received data, each packet is assigned with a sequentially incrementing identification (ID). A packet may include two kinds of data: control information and user data (also known as payload). The control information provides data the network needs to deliver the user data, for example: source and destination addresses, error detection codes (e.g., checksums), and sequencing information. Typically, control information is found in packet headers and trailers, with user data in between. Different communications protocols use different conventions for distinguishing between the elements of the packet and for formatting the data.

In one technique for reliable transmission, Transmission Control Protocol (TCP) uses a sequence number to identify each byte of data. The sequence number identifies the order of the bytes sent from each computer so that the data can be reconstructed in order, regardless of any fragmentation, disordering, or packet loss that may occur during transmission. For every payload byte transmitted the sequence number must be incremented. In some embodiments, computers that are communicating exchange an initial sequence number (ISN). This number can be arbitrary, and should be unpredictable to defend against TCP Sequence Prediction Attacks. For example, if a computer sends 4 bytes with a sequence number of 100 (conceptually, the four bytes would have a sequence number of 100, 101, 102 and 103 assigned) then the receiver would send back an acknowledgment of 104 since that is the next byte it expects to receive in the next packet.

The packet ID is usually protected by some checksum such as a cyclic redundancy check (CRC) or error-control code (ECC) such as Reed-Solomon (RS) code. Specialized forms of Reed-Solomon (RS) codes, specifically Cauchy-RS and Vandermonde-RS, can be used to overcome the unreliable nature of data transmission over channels. The encoding process assumes a code of RS(N,K) which results in N codewords being generated, whereineach codeword has a length N symbols each storing K symbols of data that are then sent over a channel.

Any combination of K codewords received at the other end is enough to reconstruct all of the N codewords. The code rate is generally set to ½ unless the channel's erasure likelihood can be adequately modeled and is seen to be less. In conclusion N is usually 2K, meaning that at least half of all the codewords sent must be received in order to reconstruct all of the codewords sent.

For example, data on a DVD is grouped into sectors of 2048 user bytes. Each sector is assigned a 4-byte Physical Sector Number (PSN). Each PSN is protected by an RS(6, 4) Reed-Solomon code, which has the capability to correct one byte in error or detect 2 or more bytes in error. The 6 bytes of PSN+ECC are stored at the beginning of each sector. However, miscorrections may occur due to corrupted data or disc seek operations may cause jumps in the packet identifier sequence, which makes it problematic to determine the actual packet identifier in an efficient manner.

SUMMARY

In general, in one aspect this specification discloses an apparatus. The apparatus includes a decoder and a packet identification tracker. The decoder is configured to decode a packet identifier from a received packet to produce a decoded packet identifier. The packet identification tracker is configured to estimate a reliability of the decoded packet identifier and determine a packet identifier of the received packet based, at least in part, on the estimated reliability of the decoded packet identifier.

In general, in another aspect this specification discloses a method. The method includes receiving a packet of data that includes an encoded packet identifier and decoding the encoded packet identifier into a decoded packet identifier. The method further includes estimating a reliability of the decoded packet identifier and determining a packet identifier of the received packet based, at least in part, on the estimated reliability of the decoded packet identifier.

In general, in one aspect this specification discloses a device. The device includes a receiver, a decoder, and a packet identification tracker. The decoder is configured to decode a packet identifier from a received packet to produce a decoded packet identifier. The decoder performs error correction if an error exists in a received packet identifier. The packet identification tracker is configured to estimate a reliability of the decoded packet identifier and determine a packet identifier of the received packet based, at least in part, on the estimated reliability of the decoded packet identifier.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one example of the boundaries. It will appreciate that in some embodiments one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Described herein are example systems, methods, and other embodiments associated with tracking packet identifiers.

Figure 1:
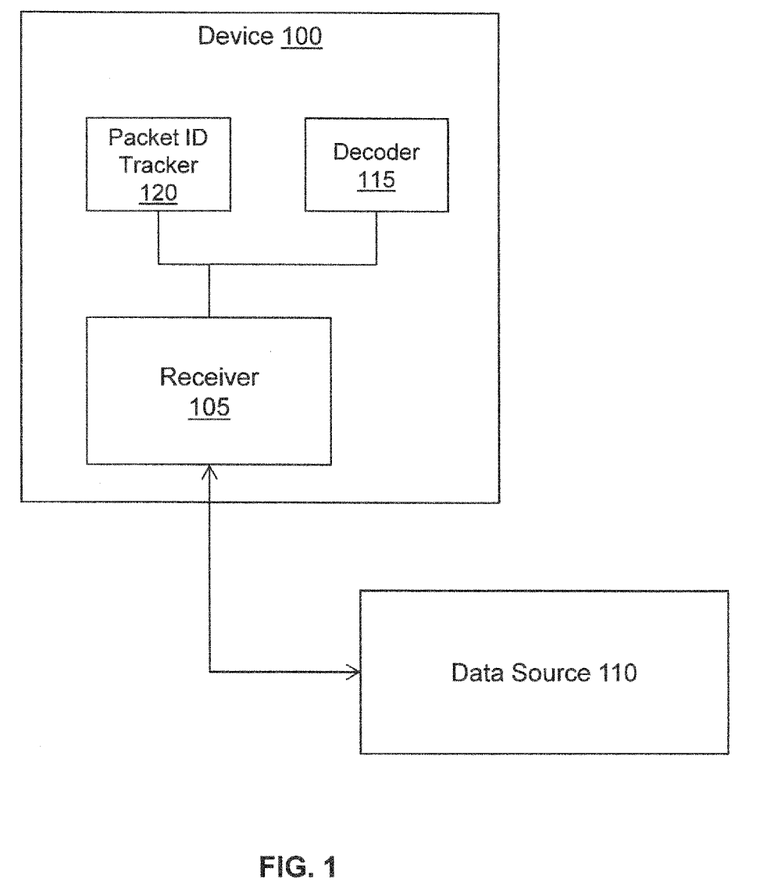
FIG. 1 illustrates one embodiment of a device associated with tracking packet identifiers.

With reference to FIG. 1, one embodiment of a device 100 is illustrated that receives data from a source and tracks packet identifiers from the data. The device 100 includes a receiver 105 configured to receive data from a data source 110. It is assumed that data from the data source 110 is organized and transmitted as packets. Each packet is transmitted with a packet identifier that identifies a sequence number for the packet. To correctly recreate the original data at the receiving end, the device 100 needs to correctly group and combine the received packets in the correct order. To perform this function, the device 100 includes a decoder 115 and a packet identification (ID) tracker 120.

In one embodiment, the decoder 115 decodes encoded information (e.g., codewords) from the received packets, which include an encoded packet identifier. The packet identifier is a sequentially assigned value that identifies the packet's order/position relative to the other packets being transmitted. For example, if a file is broken up and transmitted as 10 separate packets, the packets may be assigned packet identifiers 0 to 9. Thus regardless of the order the packets are received, the packets can be recombined in the correct order based on the packet identifiers. In one embodiment, the decoder 115 includes an error correction mechanism for correcting errors in bytes of data. For example, the error correction mechanism may be a checksum such as a cyclic redundancy check (CRC), an error-control code (ECC) such as a Reed-Solomon (RS) code, or other correction mechanism.

In one embodiment, the receiver 105 is a network communications receiver that receives and processes data communications from a network. The data source 110 is a transmitting device from a remote network location. In another embodiment, the receiver 105 is a data reader that reads and receives data from the data source 110, which is a data storage device. For example, the receiver 105 is configured to access and obtain data stored in the storage device. The storage device may be a disc drive, optical disc, a solid-state storage device, a memory, or other device that stores data.

In the communication channel between the receiver 105 and the data source 110 (whether a network communication or data storage channel), there can be a number of impairments that cause data to be corrupted. For example in a noisy environment, the received data can be corrupted such that some packet identifiers (ID) are in error or unrecoverable even after error correction operations. Sometimes, the packet ID may not be continuous from a previous ID and may contain a jump in the sequence number (e.g. 1, 2, 3,→10, 11, 12 . . . ). For example, the transmitter may intentionally re-number the packet ID from time to time, or a DVD drive may seek from one location to a different location on a disc, which causes a jump in the packet ID sequence numbers (or sector ID numbers). To help with these scenarios, the packet ID tracker 120 provides a mechanism to keep track of and/or estimate the packet ID based on prior packet information.

In one embodiment, the packet ID tracker 120 is configured to track/estimate packet identifiers based at least in part on pseudo-code that describes an algorithm as seen below. When a packet is received, the decoder 115 decodes its packet identifier and the decoded value is stored in the variable decoded_ID. The algorithm performed by the packet ID tracker 120 is:

Line1: fw0++; fw1++; //increment flywheels fw0 and fw1 at the start
Line2: // of every packet
Line3: If (decoded_ID is reliable)
Line4: {fw0=fw1=decoded_ID;}
Line5: Else if (decoded_ID is correctable) {
Line6: if (decoded_ID==fw1)
Line7: {fw0=fw1;}
Line8: else
{fw1=decoded_ID;}
Line9:}
Line10: Output fw0;

In the pseudo-code, two counters are used that are called flywheels fw0 and fw1 because they are incremented automatically at the beginning of each received packet (at line 1). At line 10, the first counter fw0 is the output of the packet ID tracker 120 and is a reliable estimate of the packet ID for the current packet. The second counter, fw1, can be considered to be a tentative estimation of the packet ID. The value of fw1 can also be considered a "possible good ID", which is described in more detail below.

In one embodiment, assume that packet identifiers for transmitted data are assigned an initial starting value (e.g., 0, 10, 100, or other value). Then assume that subsequent packets are assigned the next sequential incremented value (e.g., incremented by 1). Of course, any deterministic incremental value may be used (e.g., +2 or other value, or based on a deterministic function). When a packet is received, the packet ID tracker 120 increments the first counter fw0 and the second counter fw1 by the incremental value (in line 1 of the pseudo-code), which presumes that the next sequential packet has been received.

In line 3, the packet ID tracker 120 determines if the decoded_ID (which is received from the decoder 115) "is reliable." For example, the decoded_ID is "reliable" if no errors occurred during the decoding process. In particular, if no bytes were corrected while decoding the packet identifier, then the decoded ID is considered correct and thus reliable. As a result, in line 4, the first counter fw0 and the second counter fw1 are set equal to the decoded packet identifier if no error occurred during decoding. Even in the case where the current packet identifier jumps out of sequence from the previous packet identifier, the algorithm makes this adjustment in line 4 by setting the flywheels fw0 and fw1 to the new correct decoded_ID value. The pseudo-code then goes to line 10 where fw0 is outputted as the current packet identifier and the process repeats for the next packet.

The definition of "decoded_ID is reliable" can vary based on the type of checksum/error correction technique used. If CRC is used, the packet ID tracker 120 can declare the decoded ID "reliable" when the decoded ID passes the check. If Reed-Solomon code is used, it can be a little more complicated. For example by the nature of R-S code, it tries to correct errors in bytes but could wrongly correct certain data when a codeword is badly corrupted. This type of miscorrection occurs with a very small probability. Miscorrection means that the R-S decoder claims it corrected a number of bytes in the received data and recovered the original codeword (original packet identifier), but in reality the recovered packet identifier is different from the original packet identifier.

According to the R-S coding theory, the less number of bytes the decoder 115 corrects, the less likely a miscorrection happens. In other words, the less the number of bytes that get corrected by the R-S decoder, the more reliable the decoded codeword (packet identifier) is. Therefore in one embodiment, a threshold can be chosen to check the number of corrected bytes. When the number of corrected bytes is less than or equal to the threshold, the packet ID tracker 120 declares the decoded ID as "reliable" and sets both fw0 and fw1 equal to the decoded ID (line 4). In one embodiment, the threshold may be set to 0 to require the decoded ID to be error-free.

If one or more bytes are corrected during decoding, the decoded ID is not deemed "reliable." The determination at line 3 fails and the algorithm moves to line 5.

At line 5, the algorithm determines if the decoded ID is "correctable." For example, if the decoder 115 corrected a number of bytes from the decoded packet identifier that is greater than or equal to the threshold, then in line 6 a second check is made to verify the reliability of the decoded ID. If the decoded ID equals the second counter fw1, it means that the decoded ID equals the next sequential incremented value from the previous "possible good ID" fw1. If they are equal, then the decoded ID is declared to be reliable and the first counter fw0 is set equal to the second counter fw1 (at line 7). Fw0 is then outputted.

At line 6, if the decoded ID does not equal fw1, then a jump in packet ID values has occurred and the reliability is in question. In this case, the second counter fw1 is set equal to the decoded packet ID as a "possible good ID" (line 8) and the first counter fw0 is not updated. At line 10, the first counter fw0 is output as the packet identifier and the process continues with the next received packet.

Figure 2:
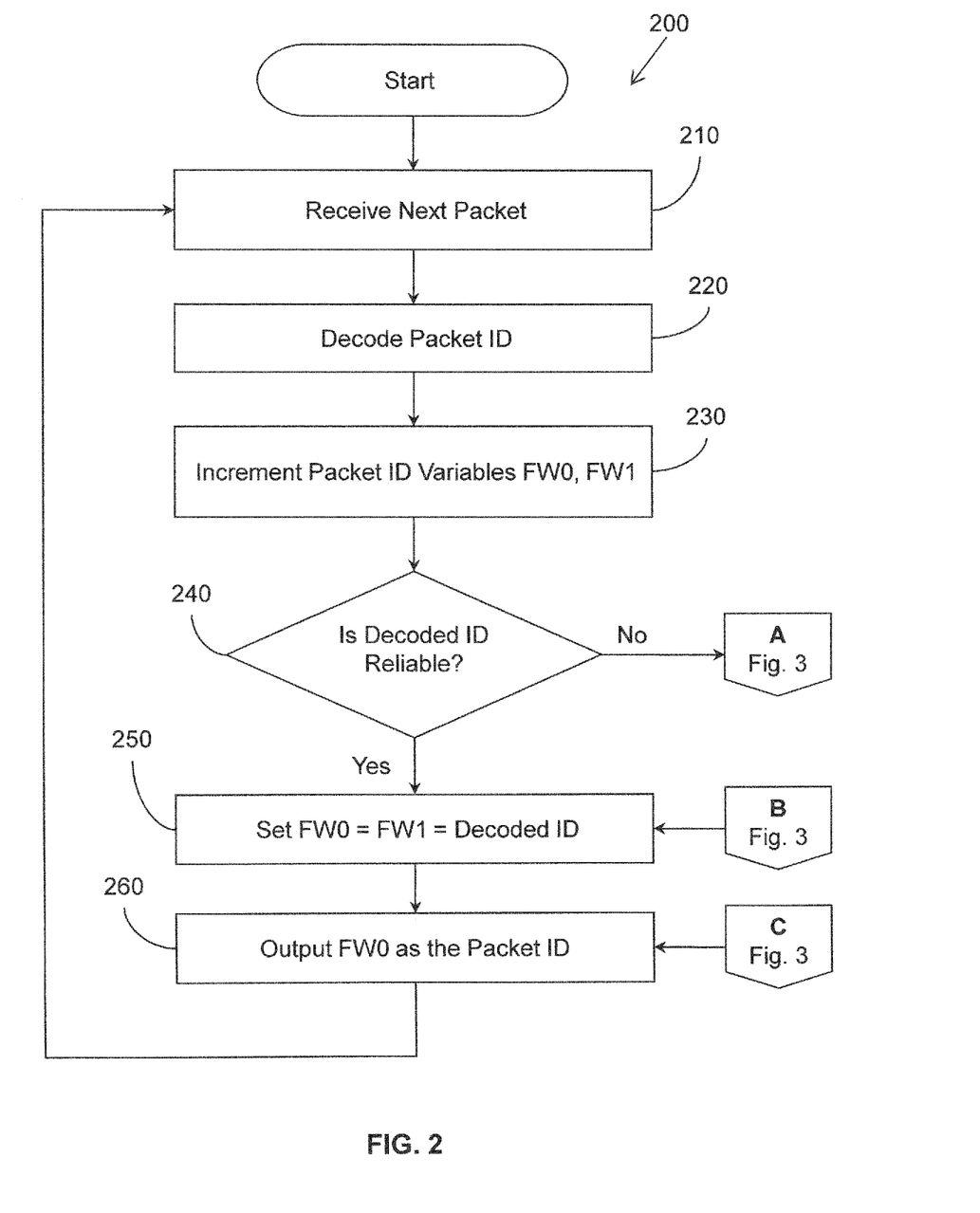
FIG. 2 illustrates one embodiment of a method for tracking packet identifiers.
Figure 3:
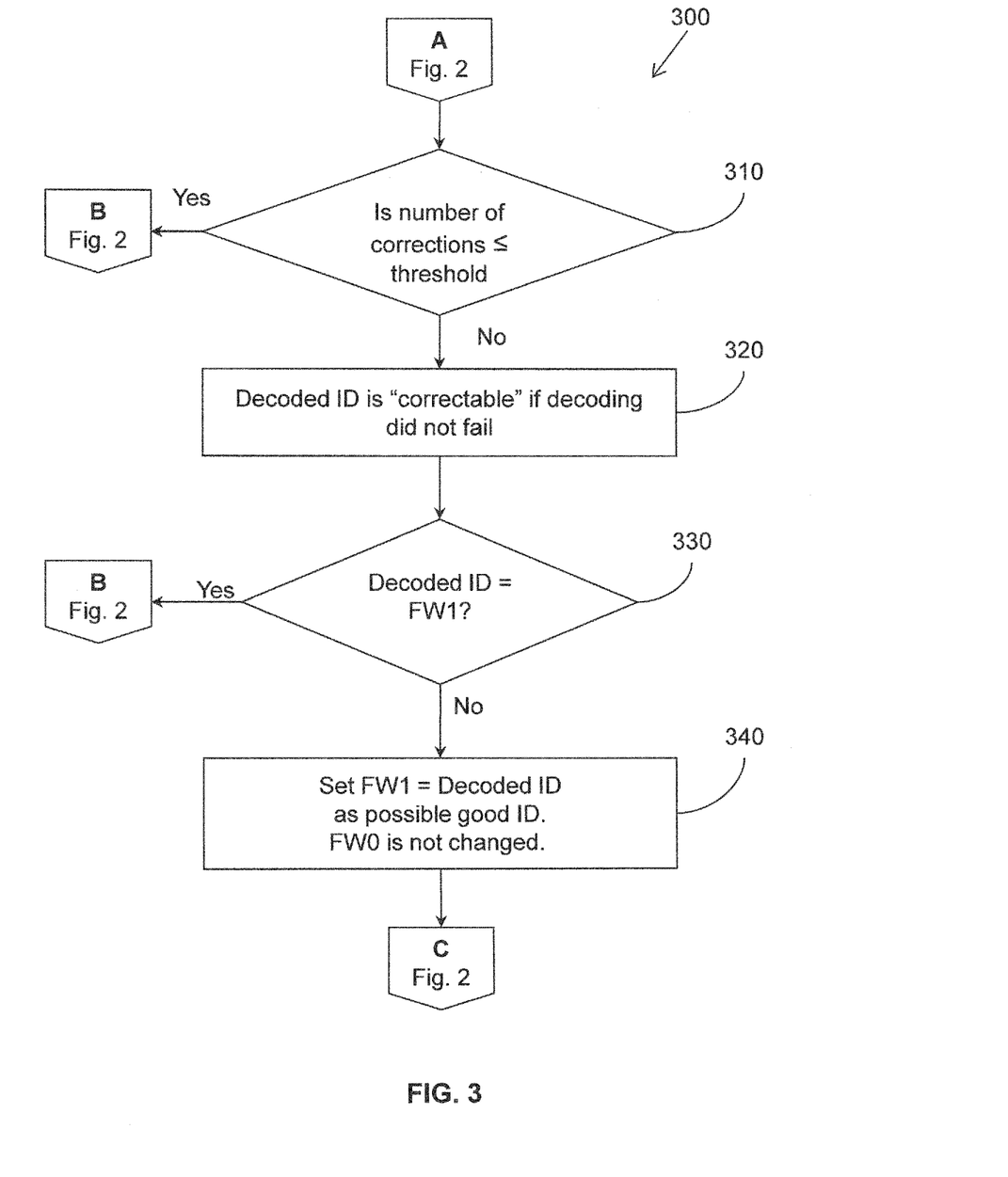
FIG. 3 illustrates a continuation of the method in FIG. 2.

With reference to FIGS. 2 and 3, one embodiment of a method 200 is shown that is performed by the packet ID tracker 120 of FIG. 1. In one embodiment, method 200 is implemented based on the pseudo-code discussed previously. Thus some details will not be repeated with the discussion of FIGS. 2 and 3. FIG. 3 is a continuation of FIG. 2 and includes a number of connection points therebetween (e.g., A, B, and C).

At 210, method 200 begins when a packet is received. The packet may be the first packet of a group or may be part of an existing packet group. At 220, the packet ID is decoded from encoded information in the received packet. This includes applying an error correction mechanism (as explained previously) to correct errors if present. At 230, flywheel variables fw0 and fw1 are incremented as explained with reference to FIG. 1.

At 240, the method determines if the decoded packet ID is reliable. The packet ID is reliable if no errors occurred during the decoding. In another embodiment, a certain number of correctable errors may be permitted. If the decoded ID is reliable, then at 250 the flywheels fw0 and fw1 are set equal to the decoded ID. At 260, fw0 is outputted as the packet identifier.

Returning to 240, if the decoded ID is not reliable (e.g., errors occurred), then the method moves to connector point A in FIG. 3. At 310, the method determines how many errors were corrected by the error correction mechanism during the decoding process. The number of symbols/bits that is capable of correction depends on the error correction code used. The number of corrected symbols is compared to a threshold. The less corrections made in the decoded packet ID, the more reliable the decoded packet ID is. The threshold is configurable and can be set to "0" to ensure the most reliable packet ID. If the threshold of corrections is not exceeded, the decoded ID can be declared reliable and the method moves to connection point B (goes to FIG. 2, block 250). At 250, the first and second counters fw0 and fw1 are set equal to the decoded ID and the process continues.

With reference again to FIG. 3, if at 310 the number of corrections exceeds the allowable threshold, then at 320 the decoded ID is determined to be "correctable" if the decoding process did not fail. For example, if too many errors occurred such that the error correction code could not recover the data from the encoded information, then the process fails. If the decoder 115 is using Reed-Solomon code, there are three possible outcomes from decoding the packet ID: (1) Declare that decoding failed, meaning that the original ID could not be recovered; (2) packet ID recovered from the encoded data, but the packet ID may be wrong if miscorrected; and (3) packet ID is reliable—corrected number of bytes is small (e.g. less than threshold) or no corrections made.

At 330, if the decoding did not fail, then a second criterion is used to check the reliability of the decoded ID. Recall that fw1 is the incremented value from the previous "possibly good ID". Thus if the decoded ID equals fw1, the system considers the decoded ID to be reliable since it is the next expected sequential value. The method moves to connection point B in FIG. 2 where at 250, fw0 and fw1 are updated with the decoded ID and the process continues.

If at 330 the decoded ID does not equal fw1, then it is not the next expected sequential value. At 340, the possible good ID value of fw1 is updated with the decoded ID but fw0 (the output value for the packet ID) is not changed. Thus fw0 is not updated until a reliable decoded ID is received. The method then continues to connection point C in FIG. 2 (block 260) where fw0 is outputted and the next packet is processed.

One feature of the present technique is reliability because the technique uses stringent conditions to declare a decoded ID as being "reliable" and controls when to update fw0. Another feature is fast acquisition to abrupt change in the packet ID. For example, when the packet ID jumps in value from the previous value (e.g., greater than the incremental value), the technique guarantees that whenever there is an error-free decoded ID or two correctable IDs that are in sequence, it will update the output fw0 to the correct new decoded ID. This feature is beneficial for storage systems because a jump in packet ID or physical sector number (PSN) means a seek operation on the disc, which is typically followed by a burst of corrupted data. In one embodiment, the algorithm is simple and may be implemented in a hardware device (e.g., ASIC), firmware, or executable instructions stored in a non-transitory computer-readable medium.

Figure 4:
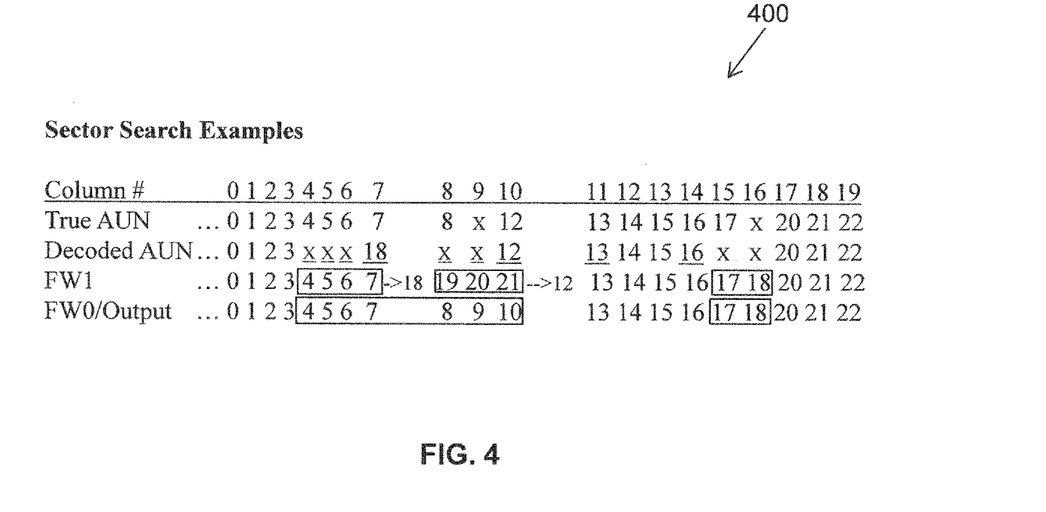
FIG. 4 illustrates one embodiment of example decoded values that may be found using the present technique.

FIG. 4 illustrates one example application of the packet ID tracker 120 for decoding address unit numbers (AUN) from data received from a storage device. In the example, the storage device is an optical storage device like a Blue Ray device. An address unit number is analogous to sectors in a DVD and is considered a packet ID as described above. Table 400 shows a set of example values and resulting values from using the present technique.

The table 400 in FIG. 4 shows a row of true address unit numbers (True AUN 0-22). These represent the original address unit numbers (e.g. analogous to a packet ID) assigned to the packet. The row of "column" numbers is only a sequential label used to help visually align the columns of numbers from the rows of data and is not involved in the actual processing. The table also shows an example of corresponding decoded AUNs that might be determined from decoding the encoded AUN from a received packet. The next two rows show example values for FW1 and FW0 as determined by the above algorithm based on the decoded AUN. The decoded AUN represents the "decoded ID."

In the table, decoded AUN values that are not underlined represent error-free values (e.g. no error correction was performed during the decoding process). Assume that the underlined numbers are "correctable" values (e.g. value recovered but with error correction). Assume that underlined "X" values mean that an error correction failure (e.g., ECC failure) occurred during decoding (e.g., AUN could not be recovered from the encoded data). In the rows of FW1 and FW0, the numbers not in a box are updated from a reliable decoded AUN while the outlined numbers (e.g., numbers in a box) are results from obtained from flywheeling (e.g. incrementing the flywheel values fw0 and fw1 when an unreliable decoded AUN is obtained).

In the example, suppose that the True AUN values 4-8 are corrupted by noise. Thus the corresponding decoded AUN values were not recovered, which is represented by an "x" value and that the underlined numbers were recovered via error correction but are not reliable In the table, suppose the row of True AUNs (packet IDs) start as 0-8, but then a seek operation is performed that jumps tracks on the storage disc to address unit 12 (which results in some corrupted data). The True AUNs continue from 12-17, then another seek operation is performed which jumps to address unit 20, and then finishes with 21 and 22.

Looking at the Decoded AUN row, suppose the decoded address unit at 4 to 9 received a lot of noise/interference and the packet IDs were corrupted. In column 4, the decoded AUN was uncorrectable, which causes the method of FIG. 2 to not change the fw0 value. Fw0 is "4", which is the incremented value from the previous reliable decoded AUN of "3". As is seen, fw0 is simply incremented by one and does not get updated until a reliable decoded AUN is obtained (e.g. a non-underlined value) or two consecutive correctable AUNs (e.g. in column 11).

In column 7, the True AUN is "7" but the decoded AUN is "18". The value "18" is declared not reliable but "correctable" since a value was returned from the decoder. Line 5 in the pseudo code passes because it is correctable but then line 6 does not pass because the decoded AUN does not match the fw1 value (e.g. fw1=7). Thus fw0 is not updated but is simply incremented for the next packet (e.g. goes from 7 to 8). Fw1 is updated to the value of "18" as a possible good ID (e.g. fw1 goes from 7 to 18).

In column 10, the decoded AUN of "12" is similarly not reliable but is deemed correctable since a value was returned from decoding. Fw1 is updated to 12 because it meets the conditions in lines 5 and 8 of the pseudo code (fw1 changes from 21 to 12, the current decoded AUN). Fw0 is not updated and stays at "10" (the next incremented value). In column 11, the decoded ID is not reliable because error correction occurred (e.g. represented by underlined value "13"). However, the value of 13 is the next sequential value of the previous fw1, and equals the current fw1 value of 13. Thus the condition in line 6 of the pseudo code is satisfied and the code declares the ID as good. Thus both fw0 and fw1 are updated to decoded AUN value of "13". So in this scenario, the packet identification tracker updates fw0 when at least two consecutive correctable decoded AUNs are obtained (e.g. 12 and 13) and that the current decoded AUN is a sequential increment of the previous decoded AUN (e.g. 13 is the incremented value from the previous value of 12). The fw0 is also updated when a reliable decoded AUN is obtained without error correction.

The remaining values in the table can be determined by following the pseudo code.

DEFINITIONS

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory computer-readable medium, and/or combinations of these to perform a function(s) or an action(s), and/or to cause a function or action from another logic, method, and/or system. Logic may include a microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that may not be illustrated.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

Previous Disclaimers Rescinded

Applicant respectfully informs the Patent Office that the present disclosure is a broadening continuation. Applicant rescinds all disclaimers made during the prosecution of the parent application(s), which may have included statements or amendments that may have disclaimed scope. Accordingly, the previous disclaimers, and the prior art that it was made to avoid, may need to be and should be re-visited.

What is claimed is:

1. An apparatus comprising,
   a decoder configured to decode a packet identifier from a received packet to produce a decoded packet identifier; and
   a packet identification tracker configured to:
   estimate a reliability of the decoded packet identifier; and
   determine a packet identifier of the received packet based, at least in part, on the estimated reliability of the decoded packet identifier;
   wherein the packet identification tracker is configured to:
   maintain a first counter and a second counter, wherein, when a new decoded packet identifier is received, i) the first counter stores a value corresponding to a most recent packet identifier that was deemed reliable incremented by an increment value and ii) the second counter stores a value corresponding to a most recent packet identifier that was deemed to be either reliable or correctable incremented by an increment value;
determine values for the first counter and the second counter based on the estimated reliability of the decoded packet identifier; and
output the value of the first counter as the packet identifier.

2. The apparatus of claim 1, wherein the packet identification tracker is configured to, when the decoded packet identifier is estimated to be reliable:
set the first counter and the second counter to the value of the reliable decoded packet identifier; and
output the value of the first counter as the packet identifier.

3. The apparatus of claim 1, wherein the packet identification tracker is configured to, when the decoded packet identifier is estimated to be correctable:
compare the correctable decoded packet identifier to the value of the second counter; and
when the value of the correctable decoded packet identifier is equal to the value of the second counter, set the value of the first and second counter to the correctable decoded packet identifier; and
when the value of the correctable decoded packet identifier is not equal to the value of the second counter, set the value of the second counter to the correctable decoded packet identifier; and
output the value of the first counter as the packet identifier.

4. The apparatus of claim 1, wherein the packet identification tracker is configured to estimate the decoded packet identifier as being reliable when a number of bytes in the decoded packet identifier that were corrected by a decoder is less than a threshold number.

5. The apparatus of claim 1, wherein the packet identification tracker is configured to estimate the decoded packet identifier as being correctable when a number of bytes in the decoded packet identifier that were corrected by a decoder is greater than a first threshold number and less than a second threshold number.

6. The apparatus of claim 1, wherein the packet identification tracker estimates a decoded packet identifier as reliable when a correctable decoded packet identifier was obtained immediately prior to the decoded packet identifier and the decoded packet identifier is a sequential increment of the prior correctable decoded packet identifier.

7. A method comprising:
receiving a packet of data, wherein the packet includes an encoded packet identifier;
decoding the encoded packet identifier into a decoded packet identifier;
estimating a reliability of the decoded packet identifier;
determining a packet identifier of the received packet based, at least in part, on the estimated reliability of the decoded packet identifier;
maintaining a first counter and a second counter, wherein, when a new decoded packet identifier is received, i) the first counter stores a value corresponding to a most recent packet identifier that was deemed reliable incremented by an increment value and ii) the second counter stores a value corresponding to a most recent packet identifier that was deemed to be either reliable or correctable incremented by an increment value;
determining values for the first counter and the second counter based on the estimated reliability of the decoded packet identifier; and
outputting the value of the first counter as the packet identifier.

8. The method of claim 7, further comprising, when the decoded packet identifier is estimated to be reliable:
setting the first counter and the second counter to the value of the reliable decoded packet identifier; and
outputting the value of the first counter as the packet identifier.

9. The method of claim 7, further comprising, when the decoded packet identifier is estimated to be correctable:
comparing the correctable decoded packet identifier to the value of the second counter; and
when the value of the correctable decoded packet identifier is equal to the value of the second counter, setting the value of the first and second counter to the correctable decoded packet identifier; and
when the value of the correctable decoded packet identifier is not equal to the value of the second counter, setting the value of the second counter to the correctable decoded packet identifier; and
outputting the value of the first counter as the packet identifier.

10. The method of claim 7, further comprising estimating the decoded packet identifier as being reliable when a number of bytes in the decoded packet identifier that were corrected by the decoder is less than a threshold number.

11. The method of claim 7, further comprising estimating the decoded packet identifier as being correctable when a number of bytes in the decoded packet identifier that were corrected by the decoder is more than a first threshold number and less than a second threshold number.

12. The method of claim 7, further comprising estimating a decoded packet identifier as being reliable when a correctable decoded packet identifier was obtained immediately prior to the decoded packet identifier and the decoded packet identifier is a sequential increment of the prior correctable decoded packet identifier.

13. A device, comprising:
a receiver configured to receive data from a data source, wherein the data is transmitted in packets;
a decoder configured to decode a packet identifier from a received packet to produce a decoded packet identifier, wherein the decoder performs error correction if an error exists in a received packet identifier; and
a packet identification tracker configured to:
estimate a reliability of the decoded packet identifier;
determine a packet identifier of the received packet based, at least in part, on the estimated reliability of the decoded packet identifier; and
maintain a first counter and a second counter, wherein, when a new decoded packet identifier is received, i) the first counter stores a value corresponding to a most recent packet identifier that was deemed reliable incremented by an increment value and ii) the second counter stores a value corresponding to a most recent packet identifier that was deemed to be either reliable or correctable incremented by an increment value.

14. The device of claim 13, wherein the packet identification tracker is further configured to:
when the decoded packet identifier is estimated to be reliable:
set the first counter and the second counter to the value of the reliable decoded packet identifier; and
output the value of the first counter as the packet identifier;
when the decoded packet identifier is estimated to be correctable:
compare the correctable decoded packet identifier to the value of the second counter; and
when the value of the correctable decoded packet identifier is equal to the value of the second counter, set the value of the first and second counter to the correctable decoded packet identifier; and when the value of the correctable decoded packet identifier is not equal to the value of the second counter, set the value of the second counter to the correctable decoded packet identifier; and output the value of the first counter as the packet identifier.

15. The device of claim 13, wherein the packet identification tracker is configured to:

estimate the decoded packet identifier as being reliable when a number of bytes in the decoded packet identifier that were corrected by a decoder is less than a first threshold number; and estimate the decoded packet identifier as being correctable when a number of bytes in the decoded packet identifier that were corrected by a decoder is greater than the first threshold number and less than a second threshold number.

16. The device of claim 13, wherein the receiver is a network communication receiver and the data source is a network device.

17. The device of claim 13, wherein the receiver is a data reader and the data source is a storage device.

18. The device of claim 13, wherein the packet identifier is a sector identifier from a storage device.

* * * * *